US012803849B2

(12) United States Patent
Tourki et al.

(10) Patent No.: US 12,803,849 B2
(45) Date of Patent: Nov. 17, 2026

(54) METHOD AND APPARATUS FOR PRECODED GUARD INTERVAL-FREE SLEPIAN-BASED WAVEFORM TRANSMISSIONS ENABLING INSTANTANEOUS-TO-AVERAGE POWER RATIO REDUCTION

(71) Applicant: HUAWEI TECHNOLOGIES CO., LTD., Shenzhen (CN)

(72) Inventors: Kamel Tourki, Munich (DE); Merouane Debbah, Munich (DE); Rostom Zakaria, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 271 days.

(21) Appl. No.: 18/770,519

(22) Filed: Jul. 11, 2024

(65) Prior Publication Data

US 2024/0372757 A1 Nov. 7, 2024

Related U.S. Application Data

(63) Continuation of application No. PCT/EP2022/050544, filed on Jan. 12, 2022.

(51) Int. Cl.
*H04L 25/03* (2006.01)
*H04L 27/26* (2006.01)

(52) U.S. Cl.
CPC .... *H04L 25/03834* (2013.01); *H04L 27/2636* (2013.01); *H04L 27/2639* (2013.01)

(58) Field of Classification Search
CPC ......... H04L 25/03834; H04L 25/03828; H04L 25/03847; H04L 25/03853; H04L 27/2636;

(Continued)

(56) References Cited

U.S. PATENT DOCUMENTS

2016/0261449 A1* 9/2016 Yang ................... H04L 27/2646
2024/0077598 A1* 3/2024 Delude ................. G01S 13/426

(Continued)

FOREIGN PATENT DOCUMENTS

WO 2022242871 A1 11/2022
WO 2023057045 A1 4/2023

OTHER PUBLICATIONS

Guan et al., "5G Field Trials: OFDM-Based Waveforms and Mixed Numerologies," in IEEE Journal on Selected Areas in Communications, vol. 35, No. 6, pp. 1-10, Institute of Electrical and Electronics Engineers, New York, New York (Jun. 2017).

(Continued)

*Primary Examiner* — Chi Tang P Cheng
*Assistant Examiner* — Michael Wayne Maddox
(74) *Attorney, Agent, or Firm* — Leydig, Voit & Mayer, Ltd.

(57) ABSTRACT

The present disclosure relates to a communication method performed by a transmitter. The method includes obtaining a plurality of data symbols, selecting a set of discrete prolate spheroidal (DPS) sequences to form a Slepian modulation matrix, determining a shaping matrix for precoding the selected set of DPS sequences, and applying the shaping matrix to the data symbols to obtain shaped data symbols. The method further includes modulating the shaped data symbols by applying the Slepian modulation matrix to the shaped data symbols to obtain a modulated sequence of shaped data symbols. The method additionally includes transmitting the modulated sequence of shaped data symbols to a receiving entity.

18 Claims, 14 Drawing Sheets

(58) Field of Classification Search
CPC ............ H04L 27/2639; H04L 27/2615; H04B 7/0456; H04B 7/0481
USPC .......................................................... 370/329
See application file for complete search history.

(56) References Cited

U.S. PATENT DOCUMENTS

| | | | | |
|---|---|---|---|---|
| 2024/0097956 | A1 * | 3/2024 | Ksairi | H04L 27/2639 |
| 2024/0113922 | A1 * | 4/2024 | Tourki | H04L 25/03828 |
| 2024/0348483 | A1 * | 10/2024 | Tourki | H04L 27/2639 |
| 2024/0380450 | A1 * | 11/2024 | Ibrahim | H04B 7/0695 |

OTHER PUBLICATIONS

Yang et al., "An Optimized Design Method of PSWFs Pulse Group Based on DFT Precoding," Journal of Physics: Conference Series, vol. 1650, No. 3, total 7 pages, XP055953455 (Oct. 2020).

Slepian et al., "Prolate Spheroidal Wave Functions, Fourier Analysis and Uncertainty-I," Bell System Technology Journal, vol. 40, pp. 43-63 (1961).

Dean et al., "A New Modulation Technique for Doppler Compensation in Frequency-Dispersive Channels", 2017 IEEE 28th Annual International Symposium on Personal, Indoor, and Mobile Radio Communications (PIMRC), total 7 pages, XP033321135, Institute of Electrical and Electronics Engineers, New York, New York (Oct. 8, 2017).

Wang et al., "Soft-Output MMSE OSIC MIMO Detector with Reduced-Complexity Approximations," 2007 IEEE 8th Workshop on Signal Processing Advances in Wireless Communications, Helsinki, total 5 pages, Institute of Electrical and Electronics Engineers, New York, New York (2007).

Hochwald et al., "Achieving Near-Capacity on a Multiple-Antenna Channel," in IEEE Transactions on Communications, vol. 51, No. 3, pp. 389-399, Institute of Electrical and Electronics Engineers, New York, New York (Mar. 2003).

Wang et al., "Wireless Communication Systems: Advanced Techniques for Signal Reception," Prentice Hall PTR, pp. 1-762 (Jun. 2, 2002).

* cited by examiner

METHOD AND APPARATUS FOR PRECODED GUARD INTERVAL-FREE SLEPIAN-BASED WAVEFORM TRANSMISSIONS ENABLING INSTANTANEOUS-TO-AVERAGE POWER RATIO REDUCTION

CROSS-REFERENCE TO RELATED APPLICATIONS

This application is a continuation of International Application No. PCT/EP2022/050544, filed on Jan. 12, 2022, the disclosure of which is hereby incorporated by reference in its entirety.

TECHNICAL FIELD

Embodiments of the present disclosure generally relate to the field of broadband cellular, i.e. to mobile networks of the fifth generation and beyond.

BACKGROUND

In telecommunications, 5G is the fifth generation technology standard for broadband cellular networks. Fifth generation new radio, 5G NR, is a new radio access technology, RAT. Likewise, further developments beyond 5G are denoted "Beyond 5G" or sometimes even 6G, i.e. referring to the sixth generation.

In order to satisfy the diverse requirements for 5G, networks need to access different frequency bands. A multilayer spectrum layout has been defined accordingly where the following requirements are fulfilled:

a. The super data layer relies on a spectrum above 6 GHz, e.g. 24.25-29.5 GHz and 37-43.5 GHz, to address specific use cases requiring extremely high data rates, such as enhanced mobile broadband, eMIBB.
b. The coverage and capacity layer relies on a spectrum in the 2 to 6 GHz range, e.g. C-band, to deliver the best compromise between capacity and coverage. Typical applications fall into ultra-reliable low-latency communications, URLLC, massive machine-type communications, mMTC, and eMBB.
c. The coverage layer exploits a spectrum below 2 GHz, e.g. 1.8 GHz, providing wide-area and deep indoor coverage. The typical applications fall into URLLC, mMTC, and eMBB.

The coverage and capacity layers are of great significance, since most of the 5G use cases rely on them. It has been suggested for the 5G, Release 16 that a contiguous band of 100 MHz should be assigned to the coverage and capacity layer. However, if it is attempted to use a single-band solution for jointly increasing both the capacity and the coverage range, this may introduce a variety of problems and may raise several challenges, such as the following ones:

- By increasing the size of each individual channel, the receiver complexity will increase accordingly.
- By adopting channel aggregation in one or more hardware units, the spectral efficiency, SE, will be challenging since 5G uses a filtered orthogonal frequency division multiplexing, f-OFDM, based waveform that needs guard bands.
- Using both polarizations, i.e. horizontal and vertical polarizations, for each channel.

In view of these problems mentioned above, the question arises whether it is possible to identify and propose a new waveform that fulfills one or more of the following requirements:

(1) a new waveform that is well time-frequency localized,
(2) a new waveform that satisfies the scalable numerology,
(3) a new waveform that is suitable to bands and carrier aggregation requirements,
(4) a new waveform that is MIMO-friendly, and
(5) a new waveform that keeps the implementation complexity low in doubly selective channels.

SUMMARY

The present disclosure relates to methods and apparatuses for communication in a broadband cellular, i.e. mobile network.

According to a first aspect, a communication method performed by a transmitter comprises: obtaining a plurality of data symbols; selecting a set of discrete prolate spheroidal, DPS, sequences to form a Slepian modulation matrix; determining a shaping matrix for precoding the selected set of DPS sequences; applying the shaping matrix to the data symbols to obtain shaped data symbols; modulating the shaped data symbols by applying the Slepian modulation matrix to the shaped data symbols to obtain a modulated sequence of shaped data symbols; and transmitting the modulated sequence of shaped data symbols to a receiving entity.

Throughout the present description, the terms shaping and precoding, as well as "shaped" and "precoded" are used synonymously.

Thus, it is provided a shaped, i.e. precoded, Slepian-based waveform, SWF, that uses Discrete Prolate Spheroidal, DPS, sequences and enables Instantaneous-to-Average Power Ratio, IAPR, reduction while eliminating the need for inserting a guard interval in the time domain. The disclosed SWF is well localized in time-frequency domain. The 5G design criteria are satisfied, and the performance of the precoded Slepian based waveform outperforms the performance of a discrete Fourier transform spread filtered orthogonal frequency division multiplexing waveform. In other words, a new precoded, i.e. shaped, Slepian-based waveform using shaped DPS sequences is disclosed that eliminates the need for inserting a time-domain guard interval. Additionally, the disclosed waveform is well localized in time-frequency domain, thereby allowing it to avoid applying Inter-Symbol Interference, ISI, mitigation technique. Without loss of generalities, the method and apparatus are provided for a single-band transmission, while both are valid when using multi-band transmission.

In a possible implementation form of the method according to the first aspect as such, the shaping matrix for precoding the selected set of DPS sequences is a matrix P of size $N_p \times N_p$ and is given by:

$$P = \underset{X}{\operatorname{argmin}} \|A - SX\|_F^2;$$

$$\text{subject to } X^H X = I$$

wherein $$A = F_1^H F_2,$$

where $$F_1^H$$

is a $J \times N_p$ inverse discrete Fourier transform, DFT, matrix, $F_2$ is a $N_p \times N_p$ DFT matrix, and A is a $J \times N_p$ DFT spread orthogonal frequency division multiplexing, DFT-s-OFDM, modulation matrix, and wherein S is the Slepian modulation matrix of size $J \times N_p$ obtained by stacking the first $N_p$ DPS sequences, where J and $N_p$ are positive integers.

In a possible implementation form of the method according to any preceding implementation form of the first aspect or the first aspect as such, selecting the set of DPS sequences to form the Slepian modulation matrix may comprise: for a frequency band $B_s$ with a central frequency $f_c$, choosing $N_p$ orthonormal DPS sequences of length $T=JT_s$, where $T_s$ is the sampling time, the DPS sequences having confined energy in the frequency band $B_s$, the DPS sequences corresponding to the first $N_p$ eigenvectors of a Slepian matrix C, wherein the elements of the Slepian matrix C are given by:

$$C[p, q] = \frac{\sin(\pi B_s T_s (p-q))}{\pi (p-q)}, (p, q) \in \{1, \ldots, J\}^2$$

wherein the eigenvalue decomposition is given by $C=UDU^H$, where the eigenvectors of C are $\{u_j\}_{j=1, \ldots, J}$, where U is a matrix, and the DPS sequences are stacked to form the columns of U, wherein $\lambda_{j_{j=1, \ldots, J}}$ are the eigenvalues of C, and the columns of U are ordered according to $\lambda_1 \geq \lambda_2 \ldots \geq \lambda_J$, and wherein the Slepian modulation matrix S is a matrix of size $J \times N_p$ obtained by stacking the first $N_p$ DPS sequences, where $U^H$ is the transpose-conjugate of U, and J and $N_p$ are positive integers.

In a possible implementation form of the method according to any preceding implementation form of the first aspect or the first aspect as such, the plurality of data symbols are coded using low-density parity-check, LDPC, channel coding, and the encoded bits are mapped to $N_p$ complex symbols following a quadrature amplitude modulation of order M, QAM-M, and the $N_p$ complex symbols are stacked into a vector $d_k$.

The present disclosure also provides a second aspect of a communication method performed at a receiver, comprising: receiving, from a transmission entity, a modulated shaped signal; selecting a set of discrete prolate spheroidal, DPS, sequences, the DPS sequences forming a demodulation matrix; determining a shaping matrix P for shaping the selected set of DPS sequences and determining the transpose-conjugate matrix $P^H$ of the shaping matrix P; demodulating the modulated shaped signal by applying the demodulation matrix to the modulated shaped signal; equalizing the demodulated shaped signal using a minimum mean square error, MMSE, equalization scheme; and applying the transpose-conjugate matrix $P^H$ of the shaping matrix P to the equalized demodulated shaped signal.

The effects of the communication method performed at the receiver are the same as for the communication method performed at the transmitter, as described above.

In a possible implementation form of the method according to the second aspect as such, the shaping matrix P is a matrix of size $N_p \times N_p$ and is given by:

$$P = \underset{X}{\operatorname{argmin}} \|A - SX\|_F^2;$$

$$\text{subject to } X^H X = I$$

wherein $$A = F_1^H F_2,$$

where $$F_1^H$$

is a $J \times N_p$ inverse discrete Fourier transform, DFT, matrix, $F_2$ is a $N_p \times N_p$ DFT matrix, and A is a $J \times N_p$ DFT spread orthogonal frequency division multiplexing, DFT-s-OFDM, modulation matrix, and wherein S is the Slepian modulation matrix of size $J \times N_p$ obtained by stacking the first $N_p$ DPS sequences, where J and $N_p$ are positive integers.

In a possible implementation form of the method according to any preceding implementation form of the second aspect or the second aspect as such, selecting the set of DPS sequences forming the demodulation matrix may comprise: for a frequency band $B_s$ with a central frequency $f_c$, choosing $N_p$ or all orthonormal DPS sequences of length $T=JT_s$, where $T_s$ is the sampling time, the DPS sequences having confined energy in in the frequency band $B_s$, the DPS sequences corresponding to the first $N_p$ or all eigenvectors of a Slepian matrix C, wherein the elements of the Slepian matrix C are given by:

$$C[p, q] = \frac{\sin(\pi B_s T_s (p-q))}{\pi (p-q)}, (p, q) \in \{1, \ldots, J\}^2$$

wherein the eigenvalue decomposition is given by $C=UDU^H$, where the eigenvectors of C are $\{u_j\}_{j=1, \ldots, J}$, where U is a matrix, and the DPS sequences are stacked to form the columns of U, wherein $\lambda_{j_{j=1, \ldots, J}}$ are the eigenvalues of C and the columns of U are ordered according to $\lambda_1 \geq \lambda_2 \ldots \geq \lambda_J$, wherein $U^H$ is the demodulation matrix, where $U^H$ is a matrix of size $J \times J$; where $U^H$ is the transpose-conjugate of U, and J and $N_p$ are positive integers.

In a possible implementation form of the method according to any preceding implementation form of the second aspect or the second aspect as such, the plurality of data symbols are decoded using low-density parity-check, LDPC, channel coding, the encoded bits are mapped to $N_p$ complex symbols following a quadrature amplitude modulation of order M, QAM-M, and the $N_p$ complex symbols are stacked into a vector $d_k$.

The present disclosure also provides a third aspect of a transmitter, comprising: an input unit for obtaining a plurality of data symbols; and a processor configured to: select a set of discrete prolate spheroidal, DPS, sequences to form a Slepian modulation matrix; determine a shaping matrix for precoding the selected set of DPS sequences; apply the shaping matrix to the data symbols to obtain shaped data symbols; modulate the shaped data symbols by applying the Slepian modulation matrix to the shaped data symbols to obtain a modulated sequence of shaped data symbols; and transmit the modulated sequence of shaped data symbols to a receiving entity.

The advantages of the transmitter of the third aspect are the same as for the corresponding method according to the first aspect described above. In addition, the transceiver implementation complexity is kept affordable for a system designed to deal with doubly selective channels and involving high mobility.

In a possible implementation form of the transmitter according to the third aspect as such, the shaping matrix for precoding the selected set of DPS sequences is a matrix P of size $N_p \times N_p$ and is given by:

$$P = \underset{X}{\operatorname{argmin}} \|A - SX\|_F^2;$$

$$\text{subject to } X^H X = I$$

wherein $$A = F_1^H F_2,$$

where $$F_1^H$$

is a $J \times N_p$ inverse discrete Fourier transform, DFT, matrix, $F_2$ is a $N_p \times N_p$ DFT matrix, and A is a $J \times N_p$ DFT spread orthogonal frequency division multiplexing, DFT-s-OFDM, modulation matrix, and wherein S is the Slepian modulation matrix of size $J \times N_p$ obtained by stacking the first $N_p$ DPS sequences, where J and $N_p$ are positive integers.

In a possible implementation form of the transmitter according to any preceding implementation form of the third aspect or the third aspect as such, to select the set of DPS sequences forming the Slepian modulation matrix, the transmitter may be configured to: choose, for a frequency band $B_s$ with a central frequency $f_c$, $N_p$ orthonormal DPS sequences of length $T=JT_s$, where $T_s$ is the sampling time, the DPS sequences having confined energy in the frequency band $B_s$, the DPS sequences corresponding to the first $N_p$ eigenvectors of a Slepian matrix C, wherein the elements of the Slepian matrix C are given by:

$$C[p, q] = \frac{\sin(\pi B_s T_s (p - q))}{\pi (p - q)}, (p, q) \in \{1, \ldots, J\}^2$$

wherein the eigenvalue decomposition is given by $C=UDU^H$, where the eigenvectors of C are $\{u_j\}_{j=1, \ldots, J}$, where U is a matrix, and the DPS sequences are stacked to form the columns of U, wherein $\lambda_{j_{j=1, \ldots, J}}$ are the eigenvalues of C and the columns of U are ordered according to $\lambda_1 \geq \lambda_2 \ldots \geq \lambda_J$, and wherein the Slepian modulation matrix S is a matrix of size $J \times N_p$ obtained by stacking the first $N_p$ DPS sequences, where $U^H$ is the transpose-conjugate of U, and J and $N_p$ are positive integers.

In a possible implementation form of the transmitter according to any preceding implementation form of the third aspect or the third aspect as such, the processor may be further configured to: encode the plurality of data symbols using low-density parity-check, LDPC, channel coding, map the encoded bits to $N_p$ complex symbols following a quadrature amplitude modulation of order M, QAM-M, and stack the $N_p$ complex symbols into a vector $d_k$.

In a possible implementation form of the transmitter according to any preceding implementation form of the third aspect or the third aspect as such, the transmitter may be a single-band transceiver or a multi-band transmitter.

The present disclosure also provides a fourth aspect of a receiver, comprising: an input unit for receiving, from a transmission entity, a modulated shaped signal; and a processor configured to: select a set of discrete prolate spheroidal, DPS, sequences, the DPS sequences forming a demodulation matrix; determine a shaping matrix P for shaping the selected set of DPS sequences and determine the transpose-conjugate matrix $P^H$ of the shaping matrix P; demodulate the modulated shaped signal by applying the demodulation matrix to the modulated shaped signal; equalize the demodulated shaped signal using a minimum mean square error, MMSE, equalization scheme; and apply the transpose-conjugate matrix $P^H$ of the shaping matrix P to the equalized demodulated shaped signal.

The advantages of the receiver of the fourth aspect are the same as for the corresponding method according to the second aspect described above. In addition, the transceiver implementation complexity is kept affordable for a system designed to deal with doubly selective channels and involving high mobility.

In a possible implementation form of the receiver according to the fourth aspect as such, the shaping matrix P is a matrix of size $N_p \times N_p$ and is given by:

$$P = \underset{X}{\operatorname{argmin}} \|A - SX\|_F^2;$$

$$\text{subject to } X^H X = I$$

wherein $$A = F_1^H F_2,$$

where $$F_1^H$$

is a $J \times N_p$ inverse discrete Fourier transform, DFT, matrix, $F_2$ is a $N_p \times N_p$ DFT matrix, and A is a $J \times N_p$ DFT spread orthogonal frequency division multiplexing, DFT-s-OFDM, modulation matrix, and wherein S is the Slepian modulation matrix of size $J \times N_p$ obtained by stacking the first $N_p$ DPS sequences, where J and $N_p$ are positive integers.

In a possible implementation form of the receiver according to any preceding implementation form of the fourth aspect or the fourth aspect as such, to select the set of DPS sequences forming the demodulation matrix, the receiver may be configured to: choose, for a frequency band $B_s$ with a central frequency $f_c$, $N_p$ or all orthonormal DPS sequences of length $T=JT_s$, where $T_s$ is the sampling time, the DPS sequences having confined energy in in the frequency band $B_s$, the DPS sequences corresponding to the first $N_p$ or all eigenvectors of a Slepian matrix C, wherein the elements of the Slepian matrix C are given by:

$$C[p,q]=\frac{\sin(\pi B_s T_s(p-q))}{\pi(p-q)},\ (p,q)\in\{1,\ldots,J\}^2$$

wherein the eigenvalue decomposition is given by $C=UDU^H$, where the eigenvectors of C are $\{u_j\}_{j=1,\ldots,J}$, where U is a matrix and the DPS sequences are stacked to form the columns of U, wherein $\lambda_{j_{j=1,\ldots,J}}$ are the eigenvalues of C and the columns of U are ordered according to $\lambda_1 \geq \lambda_2 \ldots \geq \lambda_J$, wherein $U^H$ is the demodulation matrix, where $U^H$ is a matrix of size J×J; where $U^H$ is the transpose-conjugate of U, and J and $N_p$ are positive integers.

In a possible implementation form of the receiver according to any preceding implementation form of the fourth aspect or the fourth aspect as such, the processor may be further configured to: decode the plurality of data symbols using low-density parity-check, LDPC, channel coding, map the encoded bits to $N_p$ complex symbols following a quadrature amplitude modulation of order M, QAM-M, and stack the $N_p$ complex symbols into a vector $d_k$.

In a possible implementation form of the receiver according to any preceding implementation form of the fourth aspect or the fourth aspect as such, the receiver may be a single-band transceiver or a multi-band receiver.

The present disclosure also provides a further aspect of a computer-readable medium carrying a program code which, when executed by a computer device, causes the computer device to perform the method according to any one of the preceding implementation forms of the first aspect or the first aspect as such, or any one of the preceding implementations forms of the second aspect or the second aspect as such.

The present disclosure also provides a further aspect of a computer program product comprising program code for performing the method according to any one of the preceding implementation forms of the first aspect or the first aspect as such, or any one of the preceding implementations forms of the second aspect or the second aspect as such, when executed on a computer or a processor.

Any of the above-mentioned devices may also be termed apparatuses. Any of the above-mentioned apparatuses may be embodied on an integrated chip.

BRIEF DESCRIPTION OF THE DRAWINGS

In the following, embodiments of the present disclosure are described in more detail with reference to the attached figures and drawings, in which.

DETAILED DESCRIPTION

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps, e.g. one unit performing the one or plurality of steps, or a plurality of units each performing one or more of the plurality of steps, even if such one or more units are not explicitly described or illustrated in the figures. On the other hand, for example, if a specific apparatus is described based on one or a plurality of units, e.g. functional units, a corresponding method may include one step to perform the functionality of the one or plurality of units, e.g. one step performing the functionality of the one or plurality of units, or a plurality of steps each performing the functionality of one or more of the plurality of units, even if such one or plurality of steps are not explicitly described or illustrated in the figures. Further, it is understood that the features of the various exemplary embodiments and/or aspects described herein may be combined with each other, unless specifically noted otherwise.

Figure 1:
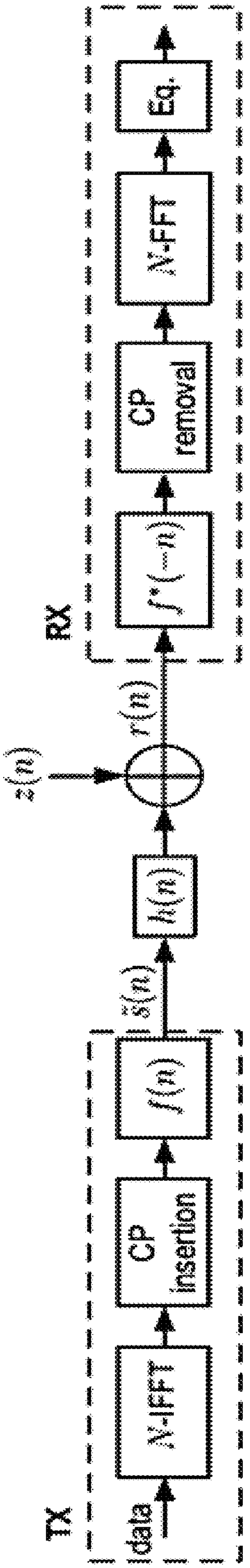
FIG. 1 illustrates a concept for both a transmitter, Tx, as well as a receiver, Rx, for a filtered OFDM transceiver.

FIG. 1 illustrates a concept for both a transmitter, Tx, as well as a receiver, Rx, for producing a spectrally localized waveform. The spectrally localized waveform shown in FIG. 1 is based on filtered orthogonal frequency division multiplexing, f-OFDM. Further elements depicted schematically in FIG. 1 for the transmitter side are an Inverse Fast Fourier Transform, IFFT, a cyclic prefix, CP, inserter and a filter f. Likewise, on the receiver side, an inverse filter f* is shown, a CP removal module, a Fast Fourier Transform, FFT, and an equalizer. By allowing the filter length to exceed the cyclic prefix, CP, length of orthogonal frequency division multiplexing, OFDM, and by designing the filter appropriately, the f-OFDM waveform may achieve a desirable frequency localization for bandwidths as narrow as a few tens of subcarriers, while keeping the inter-symbol interference/inter-carrier interference, ISI/ICI, within an acceptable limit.

While a frequency localization has been achieved through filtering, it may not be possible to confine the bandwidth of the data. This lack of design flexibility limits potential spectral efficiency, SE, gains which are envisaged for Beyond 5G and which are higher than for 5G. Furthermore, f-OFDM is not well localized in time and the filtering will not satisfy the key performance indicators, KPIs, that are envisaged for Beyond 5G in terms of latency.

A waveform referred to as Slepian-based waveform, SWF, that uses discrete prolate spheroidal, DPS, sequences for modulation and demodulation has been introduced. This waveform does not include a guard interval. Thus, this waveform is also referred to as a guard interval free, GIF, Slepian-based waveform, GIF-SWF.

The Slepian-based waveform, i.e. GIF-SWF, mentioned above does not rely on any time-domain guard interval, neither a cyclic prefix, CP, nor a zero padding, ZP, and it has been shown that this Slepian-based waveform may avoid the need to apply ISI mitigation techniques. This is due to its time-frequency localization property that satisfies the 5G and Beyond 5G design criteria. Consequently, the Slepian-based waveform reduces the out-of-band emission, OOBE, which waveforms based on orthogonal frequency division multiplexing, OFDM, might induce.

Figure 2:
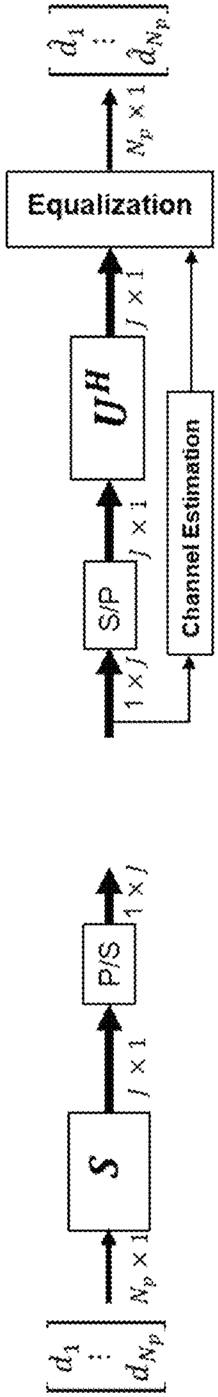
FIG. 2 illustrates a single-band implementation of a guard interval free Slepian-based waveform.

The single-band implementation of Slepian-based waveform is depicted in FIG. 2. FIG. 2 illustrates a vector $d_k=[d_{k,1} \ldots d_{k,N_p}]^T$, being a transmit data vector stacking $N_p$ complex symbols. FIG. 2 further illustrates a modulation matrix S and a parallel-to-serial converter P/S. FIG. 2 further illustrates corresponding elements for demodulation, including a serial-to-parallel converter S/P, and an equalization module. The details of modulation and demodulation of this approach, according to FIG. 2, are explained below.

Modulation of the Slepian-Based Waveform

The modulation of the Slepian-based waveform includes:

Providing a frequency band $B_s$ with a central frequency $f_c$.

Choosing $N_p$ orthonormal DPS sequences of length $T=JT_s$ with confined energy in $B_s$ given by the first $N_p$ eigenvectors of a Slepian matrix C, wherein the elements of the Slepian matrix C are given by $$C[p, q] = \frac{\sin(\pi B_s T_s (p-q))}{\pi(p-q)}, (p, q) \in \{1, \ldots, J\}^2$$

Here, the eigenvalue decomposition is given by $C=UDU^H$ where the eigenvectors of C are given by $\{u_j\}_{j=1, \ldots, J}$, the columns of U and referred to as DPS and are ordered according to their eigenvalues $\lambda_1 \geq \lambda_2 \ldots \geq \lambda_J$.

Here, the modulation matrix is denoted by S, where S is a matrix of size $J \times N_p$, stacking the first $N_p$ DPS sequences.

Figure 3:
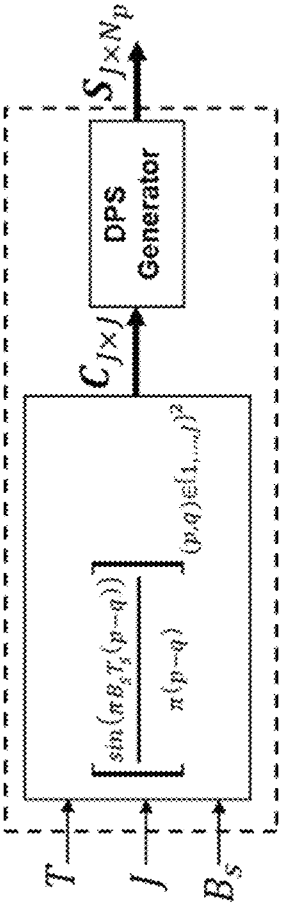
FIG. 3 illustrates a modulation matrix generation for the Slepian-based waveform of FIG. 2.

A detail of FIG. 2, namely the modulation matrix for the Slepian-based waveform may also be denoted as a modulator for GIF-SWF or likewise a GIF-SWF modulator. This modulation matrix for the Slepian-based waveform is illustrated in FIG. 3, where the time duration of the DPS sequences is $T=JT_s$ and where $T_s$ is the sampling time.

The k-th symbol of the Slepian-based waveform is given by $$x_k=ESd_k,$$

where $d_k=[d_{k,1} \ldots d_{k,N_p}]^T$ is the transmit data vector stacking $N_p$ complex symbols, drawn from a quadrature amplitude modulation of order M, QAM-M, and $E=\text{diag}\{e^{j2\pi f_c n}, n \in [J, J-1[\}$ is a diagonal matrix, and $$x_k[n] = \sum_{p=1}^{N_p} d_{k,p} S[n, p] e^{j2\pi f_c n}.$$

Demodulation of the Slepian-Based Waveform

The demodulation of the Slepian-base waveform includes:

The transpose conjugate matrix with respect to the matrix U is given by $U^H$. Here, $U^H$ is a matrix of size J×J. $U^H$ is used for demodulating symbols, at the receiver, Rx, in the baseband $B_s$.

The received time domain signal is given by $$r_k = H E S d_k + H_I E S d_{k-1} + \eta$$

where

H is the J×J lower triangular time-varying channel matrix, $H_I$ is the J×J upper triangular time-varying channel matrix that represents the ISI, and $d_{k-1}$ is the previous data vector, and $\eta$ is the J×1 additive white Gaussian noise, AWGN, vector.

At the receiver side, Rx, the demodulated signal is given by $$y_k = U^H E^H r_k = U^H E^H H E S d_k + \underbrace{U^H E^H H_I E S d_{k-1}}_{ISI} + U^H E^H \eta$$

where U as defined above is a unitary matrix stacking all DPS in its columns. Consequently, $\tilde{\eta}=U^H E^H \eta$ is still AWGN with covariance matrix $\sigma^2 I$ where I is a J×J identity matrix.

Figure 4:
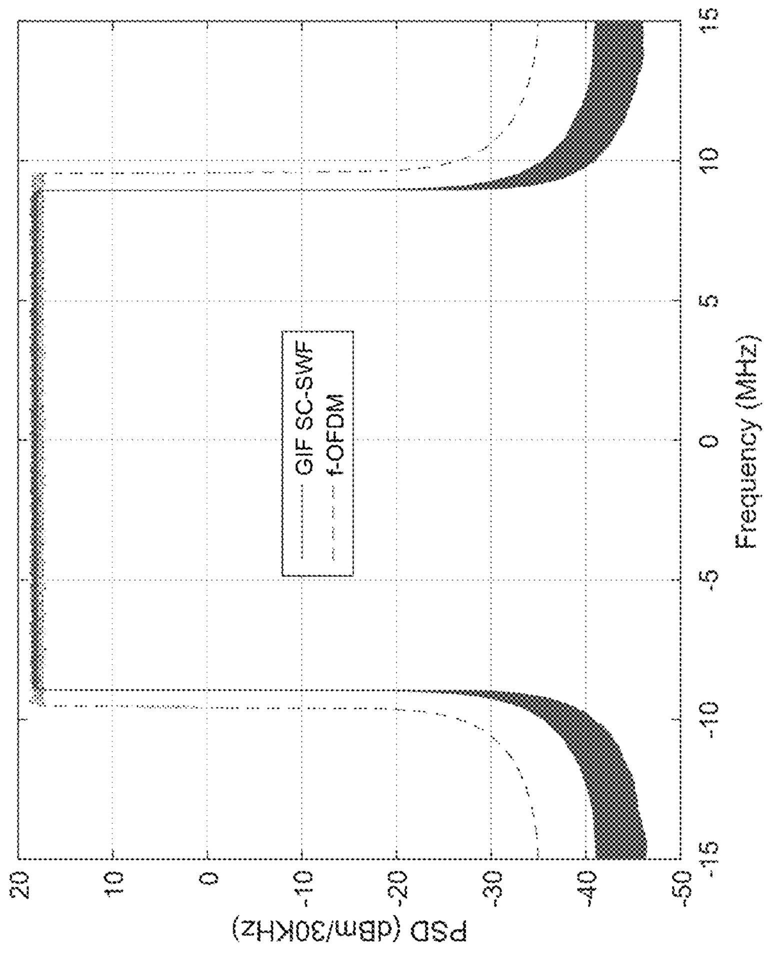
FIG. 4 illustrates a comparison of power spectral densities for the Slepian-based waveform of FIG. 2 and an f-OFDM waveform of FIG. 1.

Disadvantages of Systems According to the Prior Art:

A Slepian-based waveform as described above outperforms f-OFDM while securing a better time-frequency localization as shown in FIG. 4. FIG. 4 illustrates a comparison of the Slepian-based waveform for a single band, denoted by GIF SC-SWF, and given by the solid line in FIG. 4. This waveform should be compared to an f-OFDM waveform given by the dashed line in FIG. 4. That is, FIG. 4 illustrates the power spectral densities, PSD, of the Slepian-based waveform for a single band, GIF SC-SWF, and the f-OFDM waveform.

The time-frequency property of the above-mentioned Slepian-based waveform allows for avoiding the need to apply ISI mitigation techniques, which should further reduce the receiver complexity. However, it should be noted that, for this waveform, it is still necessary to use minimum mean squared error, MMSE, for equalization, which involves matrix inversion, which may have a large complexity and cost.

In the uplink, UL, MMSE may be handled at the receiver, Rx, which is the base station, BS. However, the instantaneous-to-average power ratio, IAPR, remains an issue at the transmitter, Tx. Consequently, it is necessary to identify a new solution that reduces the IAPR while satisfying the Beyond 5G requirements, e.g. scalable numerology, etc. Furthermore, this new solution should keep the guard interval-free scheme to boost the spectral efficiency, SE. This remains of great significance for Beyond 5G.

In view of the above, the new solution according to the present disclosure enables IAPR reduction while satisfying the Beyond 5G requirements, scalable numerology, etc. Furthermore, keeping the guard interval-free scheme to boost the spectral efficiency is of great significance for Beyond 5G.

The present disclosure discloses a new precoding scheme for the Slepian-based waveform, i.e. the GIF-SWF, through DPS sequences shaping that will be performed once "offline", without a need for any channel state information, CSI. In the following, the terms "precoding" and "shaping" are used interchangeably.

The shaped DPS sequences keep the same dimension as the generated ones, over J samples. Furthermore, this precoding saves the time-frequency localization property of the Slepian-based waveform, thus, offers higher spectral efficiency compared to f-OFDM, 5G waveform.

The solution according to an embodiment of the present disclosure permits IAPR reduction and signal-domain MMSE equalization, which deals with doubly selective channels. Therefore, the present disclosure keeps the transceiver implementation within an affordable complexity for single-user single-input single-output, SISO, transceivers, while the extension to multiple-input multiple-output, MIMO, transceivers remains straightforward. Moreover, a full framework assessment may be provided by using low-density parity-check, LDPC, channel coding.

Figure 5:
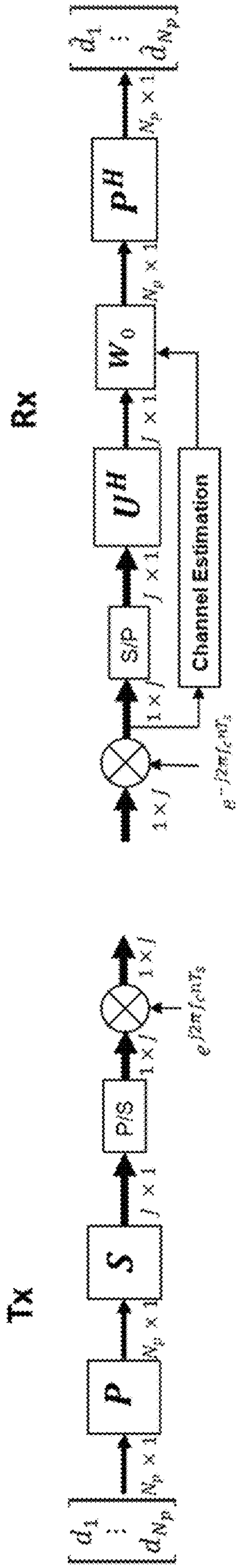
FIG. 5 illustrates a precoded, guard interval free Slepian-based waveform according to an embodiment of the present disclosure.

As indicated above, in the embodiment, it is disclosed to apply a new shaped, i.e. a new precoded, guard interval free, GIF, Slepian-based waveform. This is depicted in FIG. 5. FIG. 5 illustrates similar elements as FIG. 2. However, FIG. 5 includes additional elements as detailed in the following. In FIG. 5, the generating of the waveform on the transmitter side, Tx, includes:

Providing a frequency band $B_s$ with a central frequency $f_c$.

Choosing $N_p$ orthonormal DPS sequences of length $T=JT_3$ with confined energy in $B_3$ given by the first $N_p$ eigenvectors of a Slepian matrix C, wherein the elements of the Slepian matrix C are given by $$C[p,q] = \frac{\sin(\pi B_s T_s (p-q))}{\pi(p-q)},\ (p,q) \in \{1, \ldots, J\}^2$$

Here, the eigenvalue decomposition given by $C=UDU^H$ where the eigenvectors of C are given by $\{u_j\}_{j=1, \ldots, J}$, the columns of U and referred to as DPS, and are ordered according to their eigenvalues $\lambda_1 \geq \lambda_2 \ldots \geq \lambda_J$.

Here S is the modulation matrix. S is a matrix of size $J \times N_p$ stacking the first $N_p$ DPS sequences.

For shaping of DPS sequences, the transmitter uses a precoding matrix P of size $N_p \times N_p$, while the receiver uses $P^H$. The precoding matrix P may also be termed shaping matrix P or DPS shaping matrix P or precoder P and these terms are used synonymously in this description.

$U^H$ of size $J \times J$, is used for demodulating symbols, at Rx, in $B_s$. Thus, $U^H$ may be referred to as demodulation matrix.

Figure 6:
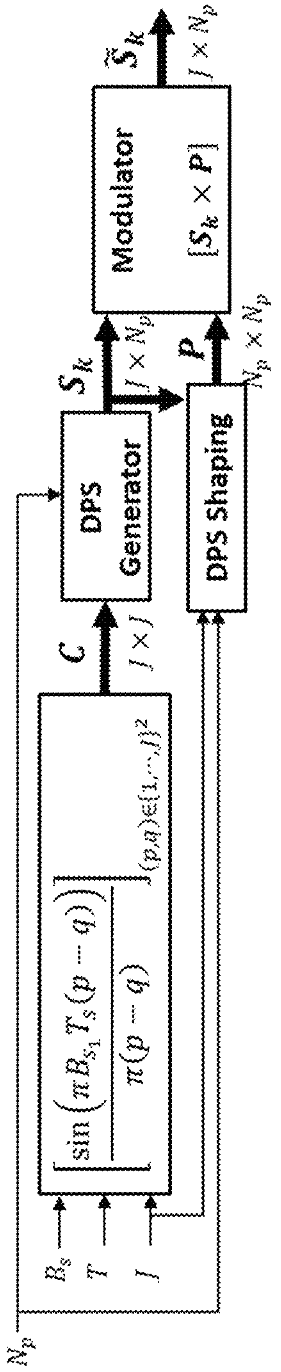
FIG. 6 illustrates the discrete prolate spheroidal and shaping, i.e. precoding, modulation matrices for the DPS-based Slepian-based waveform of the embodiment of FIG. 5.

FIG. 6 depicts the DPS generation and shaping modulation matrices, for the GIF Slepian-based waveform of FIG. 5. For FIG. 6, the time duration of the DPS sequences is $T=JT_s$, and $T_s$ is the sampling time. The resulting shaped, i.e. precoded, modulation matrix is given by $\tilde{S}=S\,P$, where the index k, which refers to the flexibility of the matrix S to the assigned data throughput, is dropped.

The DPS shaping matrix P is given as a solution of the following problem:

$$P = \underset{X}{\operatorname{argmin}} \|A - SX\|_F^2$$

$$\text{subject to } X^H X = I$$

wherein $$= F_1^H F_2,$$

where $$F_1^H$$

is a $J \times N_p$ inverse discrete Fourier transform, DFT, matrix, $F_2$ is a $N_p \times N_p$ DFT matrix, and A is a $J \times N_p$ DFT spread orthogonal frequency division multiplexing, DFT-s-OFDM, modulation matrix. Consequently, the solution of the optimization problem is given by $$= V_2 V_I^H,$$

where $V_1$ and $V_2$ are obtained using the singular value decomposition, SVD, decomposition of $A^H S$ such that $$A^H S = V_1 \Delta V_2^H.$$

Therefore, the DPS shaping matrix P may be computed "offline", since P does not depend on channel state information, CSI.

Considering low-density parity-check, LDPC, channel coding, the encoded bits are mapped into $N_p$ complex symbols following a quadrature amplitude modulation of order M, QAM-M, and stacked into a vector $d_k$. Therefore, the k-th transmitted symbol of the Slepian based waveform is given by $$x_k = E\tilde{S}d_k,$$

where $d_k=[d_{k,1} \ldots d_{k,N_p}]^T$, $E=\text{diag}\{e^{j2\pi f_c n}, n \in [J, J-1[\}$, and $$x_k[n] = \sum_{p=1}^{N_p} d_{k,p} \tilde{S}[n,p] e^{j2\pi f_c n}.$$

The time-domain received signal is given by $$r_k = H E \tilde{S} d_k + H_I E \tilde{S} d_{k-1} + \eta$$

where

H is the J×J lower triangular time-varying channel matrix, $H_I$ is the J×J upper triangular time-varying channel matrix that represents the ISI, $d_{k-1}$ is the previous data vector, and η is the J×1 additive white Gaussian noise, AWGN, vector.

At the receiver side, Rx, the demodulated signal is given by $$y_k = U^H E^H r_k = U^H E^H H E \tilde{S} d_k + \underbrace{U^H E^H H_I E \tilde{S} d_{k-1}}_{ISI} + U^H E^H \eta$$

where U has been defined above as the matrix stacking all shaped DPS sequences in its columns. Consequently, $\tilde{\eta} = U^H E^H \eta$ is still an AWGN vector having a covariance matrix $\sigma^2 I$ where I is a $N_p \times N_p$ identity matrix. Furthermore, the effective channels are denoted as $Q = U^H E^H H E \tilde{S}$ and $Q_I = U^H E^H H_I E \tilde{S}$.

In time-varying channels, the channel impulse response varies even within one symbol $x_k$ of the Slepian-based waveform. Furthermore, the time-domain guard interval removal induces ISI as stated above. However, in the following, MMSE equalization is used without relying on any additional ISI mitigation technique in order to show that the shaped DPS are still well localized in both time and frequency.

A. Equalization

In this scheme, the MMSE equalization considers ISI as noise and is given by $$W_0 = Q^H \left(QQ^H + \sigma^2 I + Q_I Q_I^H\right)^{-1}$$

It applies to the demodulated signal $y_k$ followed by $P^H$ as $$\tilde{d}_k = P^H W_0 y_k = P^H Q^H \left(QQ^H + \sigma^2 I + Q_I Q_I^H\right)^{-1} y_k$$

where the equalization output samples are given by $$\tilde{d}_{k,z} = \mu_{k,z} d_{k,z} + \xi_{k,z},\ z = 0, \ldots, N_p - 1,$$

where $\mu_{k,z}$ are the diagonal entries of $P^H W_0 Q P$, and $\xi_{k,z}$ is an AWGN with variance $$\sigma_{k,z}^2 = \mu_{k,z} - \mu_{k,z}^{\ 2}.$$

A. Detection

The log-likelihood ratio, LLR, of the i-th bit of the z-th complex sample in the transmit vector $d_k$ is approximated as $$LLR(b_{k,z,i}) \approx \frac{1}{\sigma_{k,z}^2}\left(\min_{b_{k,z} \in \mathcal{B}_i^-} \left|\tilde{d}_{k,z} - \mu_{k,z} d(b_{k,z})\right|^2 - \min_{b_{k,z} \in \mathcal{B}_i^+} \left|\tilde{d}_{k,z} - \mu_{k,z} d(b_{k,z})\right|^2\right)$$

$b_{k,z} \in \{-1, +1\}^m$ is a binary vector, d ($b_{k,z}$) is the symbol ma pin $2^m$-QAM for example, and $\mathcal{B}_i^+$ (resp. $\mathcal{B}_i^-$) is the set of all vectors $b_{k,z}$ with «+1», resp., «−1», in their i-th entry.

In the particular case of quadratic phase-shift keying, QPSK, mapping, the exact log-likelihood ratios, LLRs, are given by $$LLR(b_{k,z,0}) = \frac{2\sqrt{2}}{1-\mu_{k,z}} \Re\{\tilde{d}_{k,z}\},\ LLR(b_{k,z,1}) = \frac{2\sqrt{2}}{1-\mu_{k,z}} \Im\{\tilde{d}_{k,z}\}$$

The following figures, FIGS. 7, 8A, 8B, 9, 10A and 10B, should serve to assess the performance of the Slepian-based waveform, and in particular the precoded Slepian-based waveform, in third-generation partnership project, 3GPP, channels. As a benchmark, the uplink, UL, is considered where both filtered orthogonal frequency division multiplexing, f-OFDM, and discrete Fourier transform spread filtered orthogonal frequency division multiplexing, DFT-s-f-OFDM, systems are transmitting four resource blocks at the edge of a 20 MHz band. Therefore, this includes $N_a$=48 data, i.e. active, subcarriers with a fast Fourier transform, FFT, size $N_{FFT}$=2048 and a subcarrier spacing δf=15 kHz, while the data bandwidth is 720 kHz. Hence, the sampling frequency should be set to $f_s$=7.68 MHz and it is considered the CP length L=144. Both f-OFDM and DFT-s-f-OFDM use a filter, respectively, wherein the filter is given by $$f[n] = \frac{\sin(\omega_c n)}{\omega_c n}\left(\frac{1}{2} - \frac{1}{2}\cos\left(\frac{2\pi n}{L_f - 1}\right)\right)^{0.6}$$

where $L_f$=1025 and where $\omega_c$=0.0813 is the normalized cut-off frequency. Furthermore, QPSK and QAM-16 symbols are considered for transmission using a carrier frequency $f_c$=4 GHz and the LDPC code rate of 2. A comparison is carried out where the performance results will be discussed assuming perfect channel state information, CSI, knowledge at the receiver.

Figure 7:
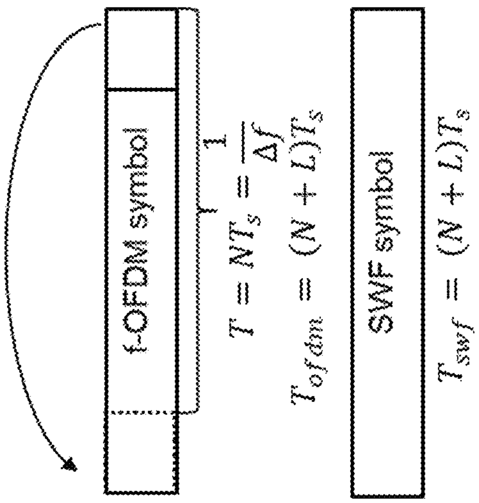
FIG. 7 illustrates a comparison of a time duration of a symbol of the Slepian-based waveform, and a time duration of a symbol for f-OFDM.

FIG. 7 illustrates a comparison of a time duration $T_{swf}$ of a symbol of the Slepian based waveform, denoted SWF symbol in FIG. 7, and a time duration $T_{ofdm}$ of a symbol for f-OFDM. Referring to FIG. 7, the Slepian based waveform symbol time duration should be equal to the f-OFDM/DFT-s-f-OFDM symbol time duration, using the values for the time duration of $T_{ofdm}$=$T_{swf}$=71.36 μs.

Figure 8A:
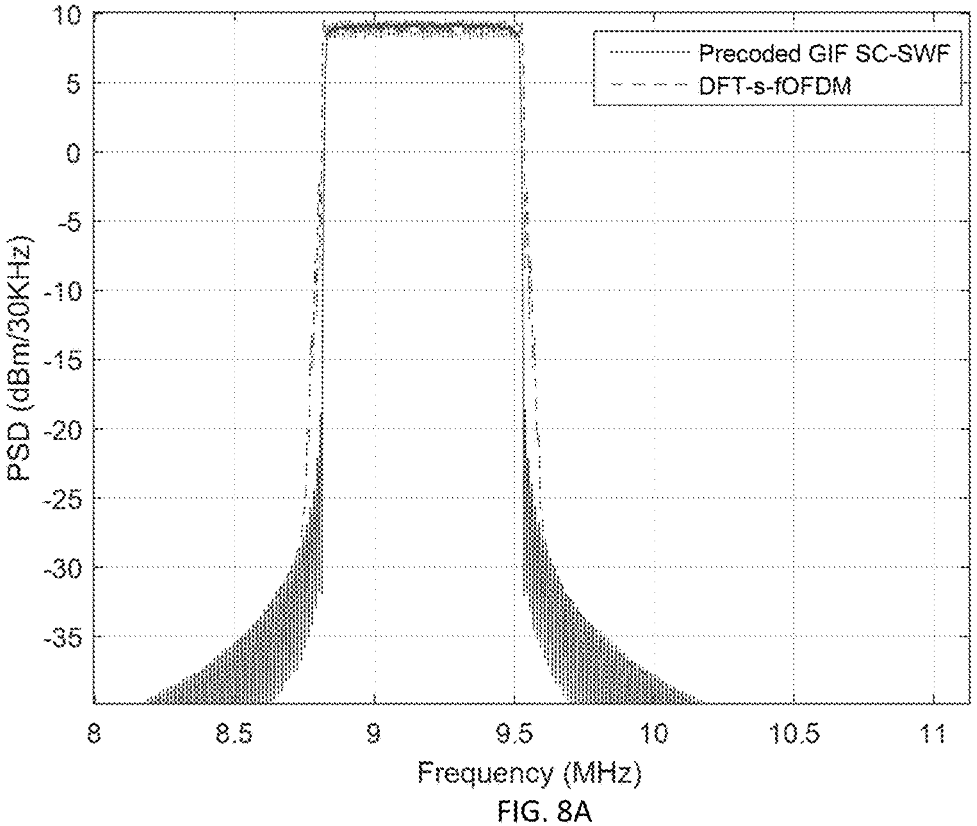
FIGS. 8A-8B illustrates the power spectral densities of the precoded Slepian-based waveform and the discrete Fourier transform spread filtered orthogonal frequency division multiplexing waveform.
Figure 8B:
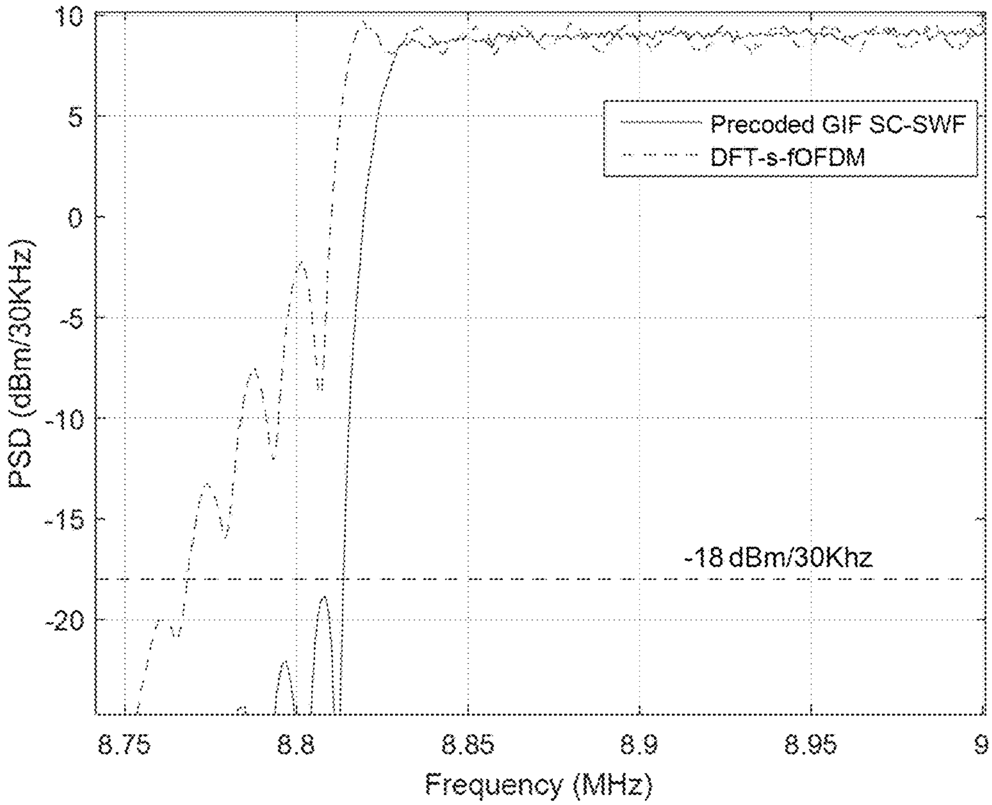

For the precoded Slepian based waveform, the same data rate as for f-OFDM, $N_p$=48, has been considered, where the data bandwidth needed to transmit the same data throughput is $B_s$=715 kHz. FIG. 8 illustrates the power spectral densities, PSDs, of the precoded Slepian based waveform and the DFT-s-f-OFDM. FIG. 8A illustrates the PSDs over the frequency range from about 8 MHz to 11 MHz. FIG. 8B illustrates the left edge of what is shown in FIG. 8A in more detail. In FIG. 8A as well as in FIG. 8B, the solid line refers to the precoded Slepian based waveform for a single band, denoted "precoded GIF SC-SWF". In FIG. 8A as well as FIG. 8B, the dashed line refers to the DFT-s-f-OFDM waveform.

Both FIG. 8A and FIG. 8B show that the precoded Slepian based waveform exhibits lower out-of-band emission and requires a smaller spectrum guard band leading to a higher spectral efficiency than the DFT-s-f-OFDM waveform.

As mentioned above, the guard band needed is defined referring to the 3GPP mask requirement, which is at −18 dBm/30 kHz (−18 decibel-milliwatts/30 kilohertz) for UL, see FIG. 8B, giving 89.063 kHz and 4.063 kHz for DFT-s-f-OFDM and Slepian based waveform, respectively. Such guard bands should be scaled by 4/106 since only four RBs are used among 106 possible RBs in a 20 MHz band.

Figure 9:
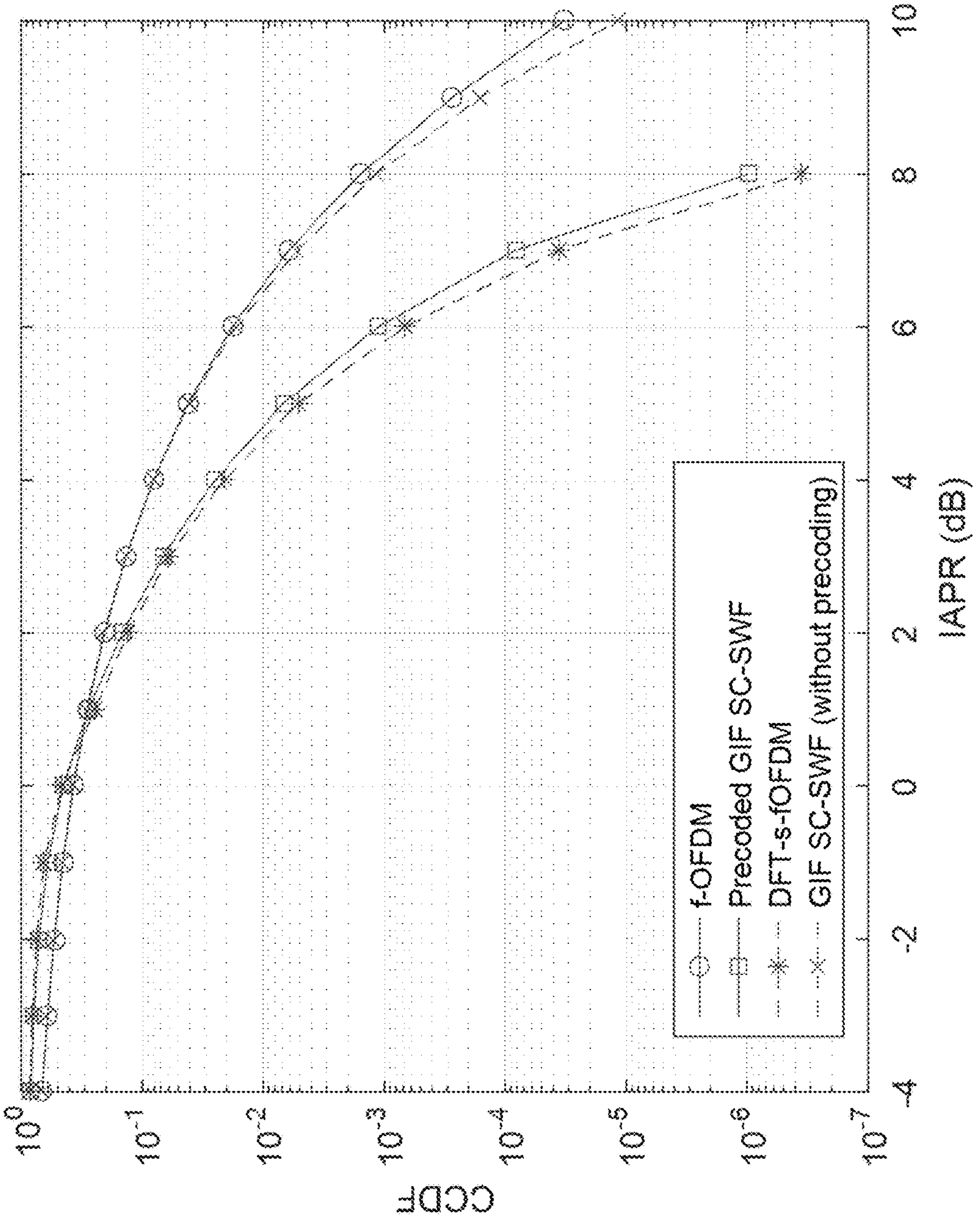
FIG. 9 illustrates a comparison of four different waveforms, including the precoded Slepian-based waveform of FIGS. 1, 2, and 5.

FIG. 9 illustrates a comparison of four different waveforms. The open circles connected by a solid line represent the f-OFDM. The crosses connected by a dashed line represent a Slepian based waveform without precoding, denoted GIF-SC-SWF (without precoding). The open squares connected by a solid line represent the precoded Slepian based waveform for a single band, denoted "precoded GIF SC-SWF". The asterisks (stars) connected by a dashed line represent DFT-s-f-OFDM. With respect to FIG. 9, it should be noted that without precoding, the Slepian based waveform GIF SC-SWF (without precoding) has slightly better IAPR performance than f-OFDM. However, when applying the precoding according to the present disclosure, the precoded Slepian based waveform, i.e. GIF SC-SWF (with precoding), has a slightly worse IAPR performance compared to DFT-s-f-OFDM. On the other hand, the precoded Slepian based waveform, i.e. GIF SC-SWF (with precoding), brings about 3 dB IAPR reduction.

Figure 10A:
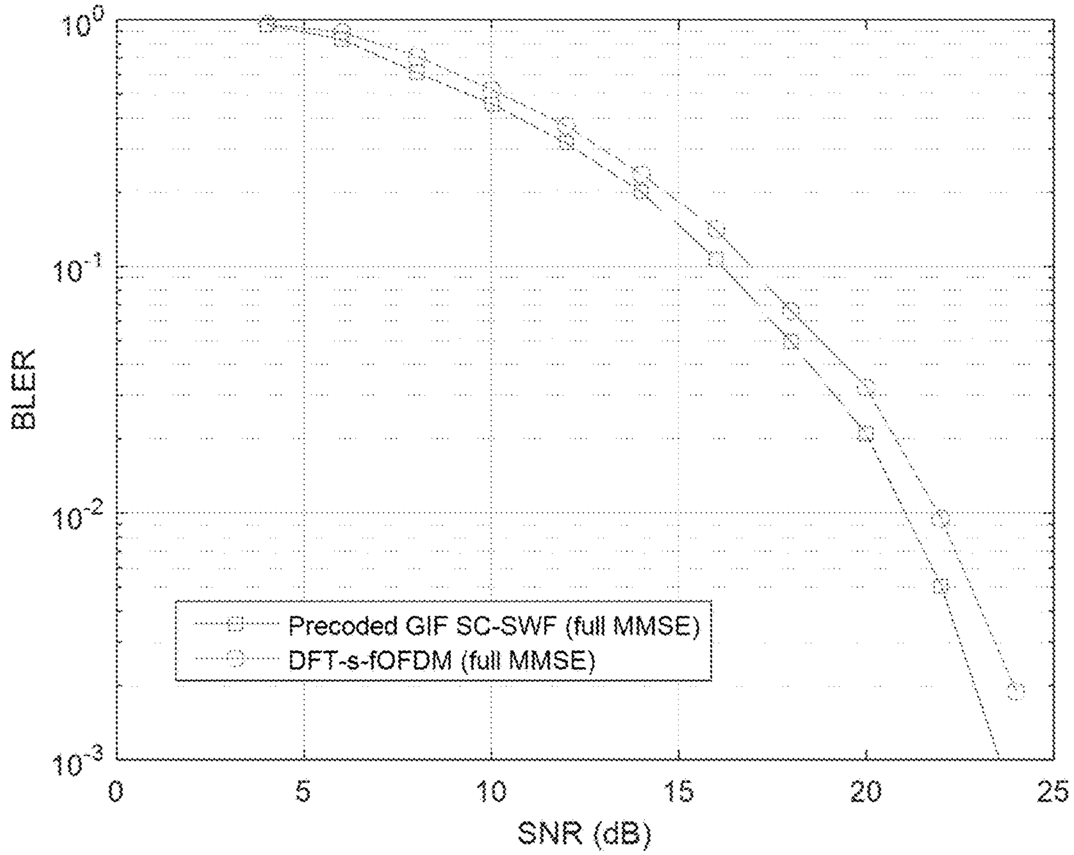
FIG. 10 consists of subfigures FIG. 10A and FIG. 10B, which compare two different waveforms, namely a discrete Fourier transform spread filtered orthogonal frequency division multiplexing waveform and the precoded Slepian-based waveform of FIGS. 5 and 6, wherein a minimum mean square error equalization scheme has been applied for both waveforms, respectively.
Figure 10B:
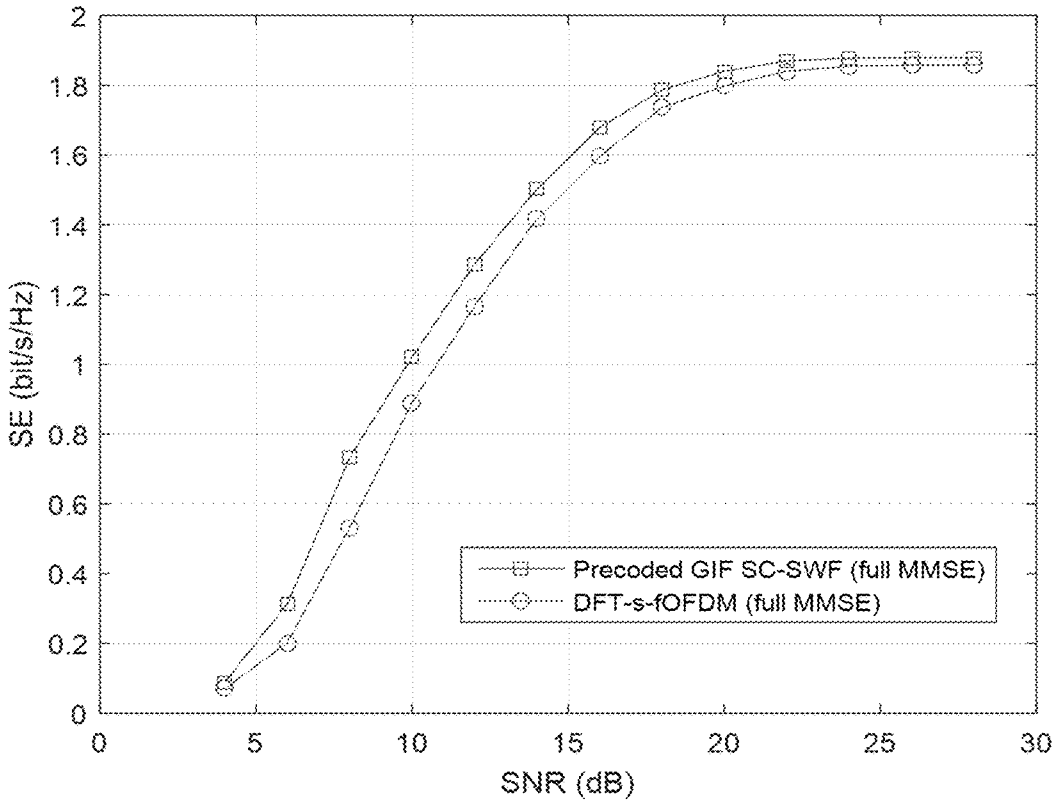

FIG. 10 consists of two subfigures, namely FIG. 10A and FIG. 10B. In FIG. 10A and FIG. 10B, two different waveforms are compared. The open circles connected by a solid line represent the DFT-s-f-OFDM. The open squares connected by a solid line represent the precoded Slepian based waveform for a single band, GIF SC-SWF. For both, the DFT-s-f-OFDM as well as the precoded GIF SC-SWF, a minimum mean square error, MMSE, equalization scheme has been applied, respectively. Thus, the two waveforms are denoted "Precoded GIF SC-SWF (full MMSE)" and "DFT-s-f-OFDM (full MMSE)", respectively. FIG. 10A compares the block-error rate, BLER as a function of the signal to noise ratio, SNR, for either of the two waveforms. FIG. 10B compares the spectral efficiency, SE, for either of the two waveforms.

In FIG. 10B, the spectral efficiency, SE, is given by the expression:

$$\eta = \frac{\chi}{T \cdot \omega} = \frac{\chi}{T \cdot (BW_{data} + \Delta G_{sub})}$$

where $\chi$ is (TBS size for four PRB)×(1-simulated BLER) and TBS is the transport block size. Considering the Tapped Delay Line model C (TDL-C 300 ns) channels, the performances have been provided in terms on block-error rate, BLER, and SE as functions of the signal to noise ratios, SNRs, and shown in FIG. 10A. A high velocity has been considered where v=120 Km/h leading to a Doppler frequency spread of $f_d$=444 Hz and it is assumed that DFT-s-f-OFDM is using full MMSE equalization in order to keep the comparison meaningful.

It is worth noting that the precoded Slepian based waveform, i.e. the GIF-SWF, outperforms DFT-s-f-OFDM in terms of reliability and spectral efficiency while both scheme perform the full MMSE equalization. In other words, in FIG. 10A, it is illustrated that the block-error rate, BLER, for the precoded Slepian based waveform is lower, i.e. better, than for the DFT-s-f-OFDM. Likewise, in FIG. 10B, it is illustrated that the spectral efficiency, SE, for the precoded Slepian based waveform is higher than for the DFT-s-f-OFDM. In addition, it is worth noting that the precoded Slepian based waveform, i.e. GIF-SWF, MMSE complexity order is of the order of $J^3$, i.e. $O(J^3)$, while DFT-s-f-OFDM MMSE complexity order is of the order of $N^3$, i.e. $O(N^3)$. The precoded Slepian based waveform has better performance in terms of lower SNR at 10% of BLER and higher SE than DFT-s-f-OFDM.

Figure 11:
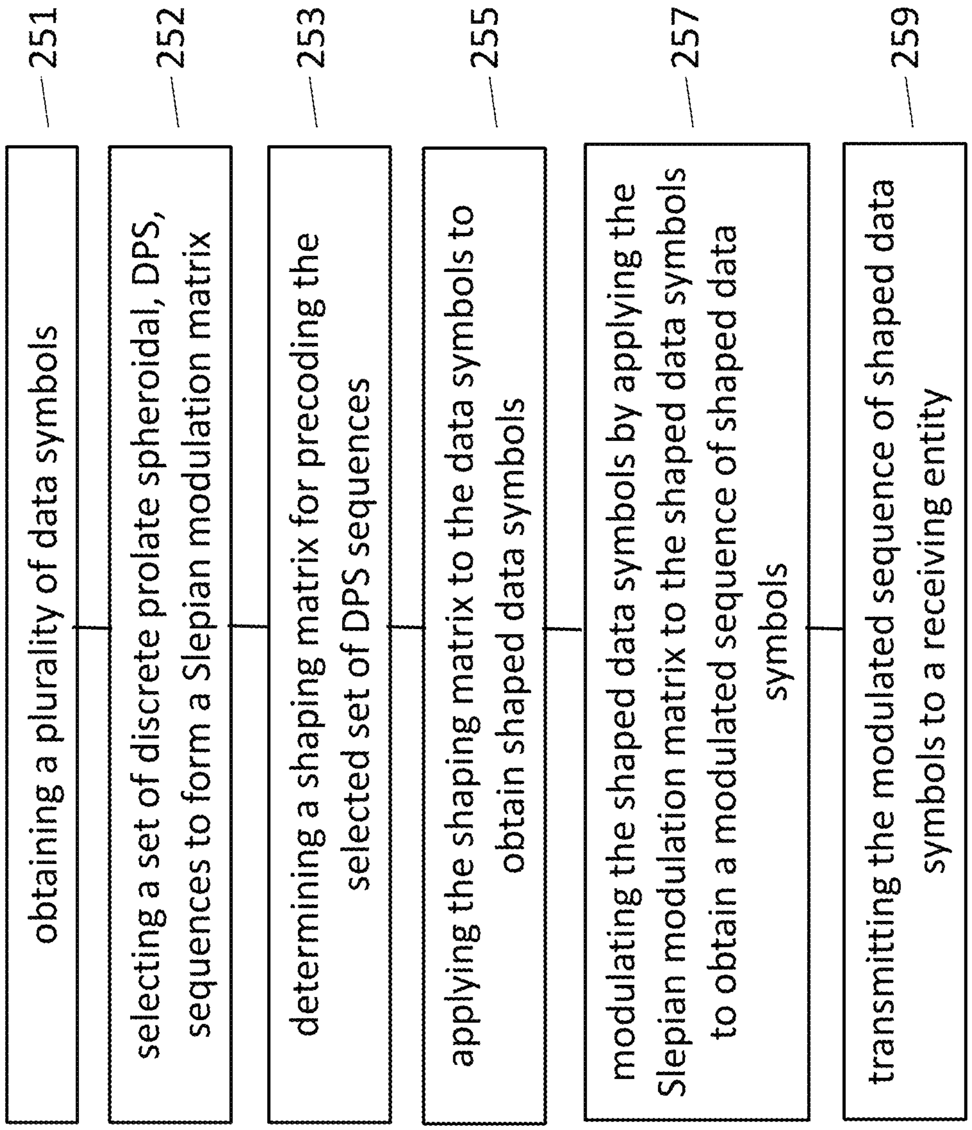
FIG. 11 illustrates a communication method performed by a transmitter according to an embodiment of the present disclosure.

FIG. 11 illustrates another embodiment of the present disclosure. FIG. 11 illustrates a communication method performed by a transmitter, comprising the following steps: step 251 of obtaining a plurality of data symbols; step 252 of selecting a set of discrete prolate spheroidal, DPS, sequences to form a Slepian modulation matrix; step 253 of determining a shaping matrix for precoding the selected set of DPS sequences; step 255 of applying the shaping matrix to the data symbols to obtain shaped data symbols; step 257 of modulating the shaped data symbols by applying the Slepian modulation matrix to the shaped data symbols to obtain a modulated sequence of shaped data symbols; and step 259 of transmitting the modulated sequence of shaped data symbols to a receiving entity.

Figure 12:
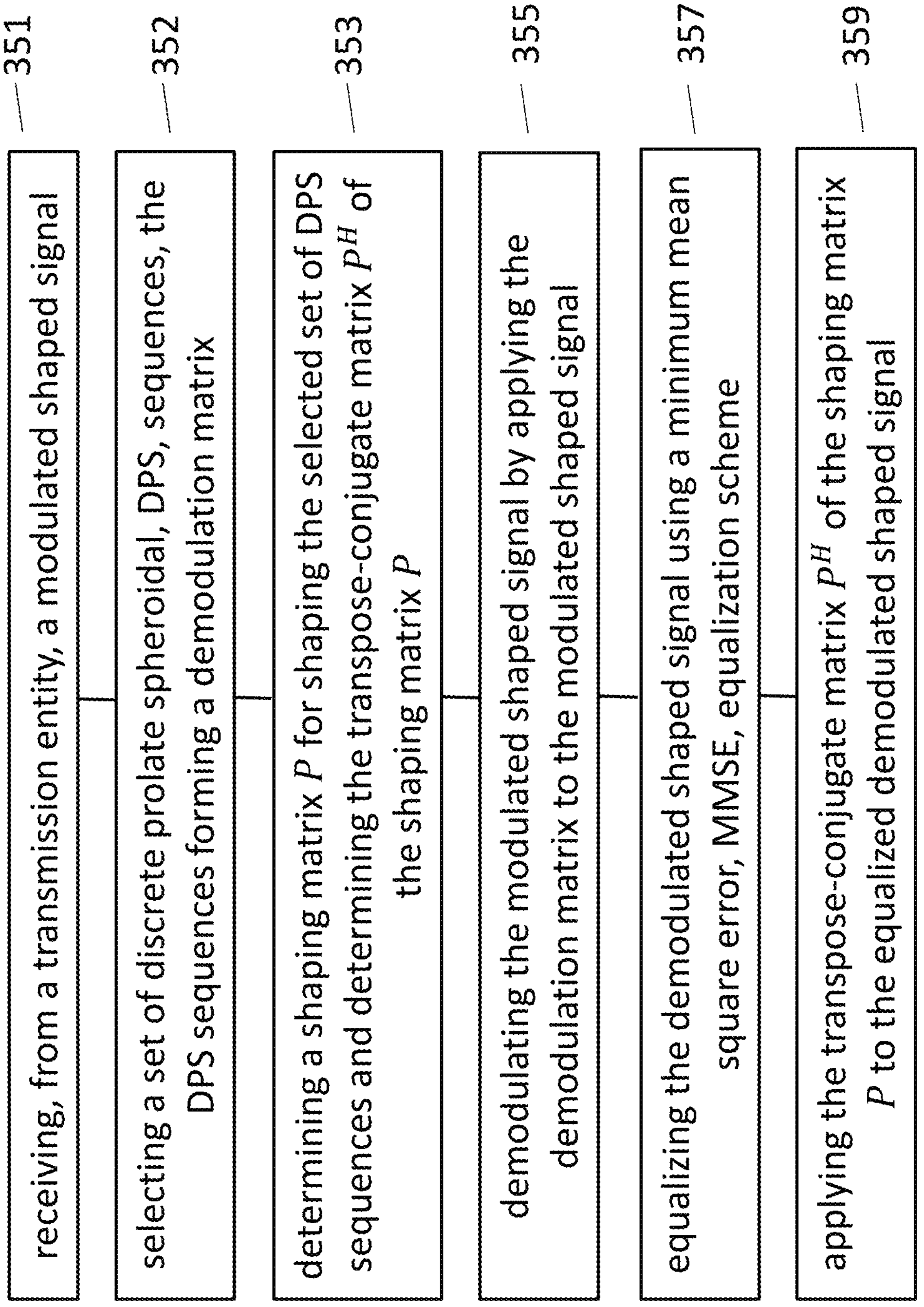
FIG. 12 illustrates a communication method performed by a receiver according to an embodiment of the present disclosure.

FIG. 12 illustrates a further embodiment of the present disclosure. FIG. 12 illustrates a communication method performed by a receiver, comprising the following steps: step 351 of receiving, from a transmission entity, a modulated shaped signal; step 352 of selecting a set of discrete prolate spheroidal, DPS, sequences, the DPS sequences forming a demodulation matrix; step 353 of determining a shaping matrix P for shaping the selected set of DPS sequences and determining the transpose-conjugate matrix $P^H$ of the shaping matrix P; step 355 of demodulating the modulated shaped signal by applying the demodulation matrix to the modulated shaped signal; step 357 of equalizing the demodulated shaped signal using a minimum mean square error, MMSE, equalization scheme; and step 359 of applying the transpose-conjugate matrix $P^H$ of the shaping matrix P to the equalized demodulated shaped signal.

Figure 13:
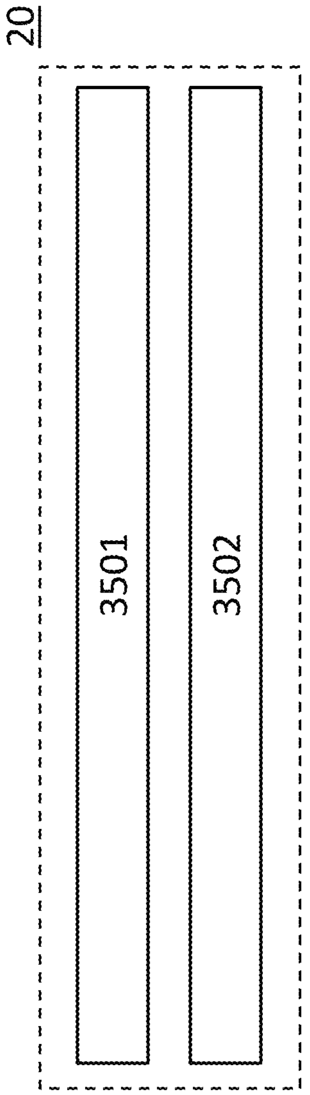
FIG. 13 illustrates a transmitter according to an embodiment of the present disclosure.

FIG. 13 illustrates a further embodiment of the present disclosure. FIG. 13 illustrates a transmitting device, i.e. a transmitter 20, comprising: an input unit 3501 for obtaining a plurality of data symbols; and a processor 3502, wherein the processor 3502 is configured to: select a set of discrete prolate spheroidal, DPS, sequences to form a Slepian modulation matrix; determine a shaping matrix for precoding the selected set of DPS sequences; apply the shaping matrix to the data symbols to obtain shaped data symbols; modulate the shaped data symbols by applying the Slepian modulation matrix to the shaped data symbols to obtain a modulated sequence of shaped data symbols; and transmit the modulated sequence of shaped data symbols to a receiving entity.

Figure 14:
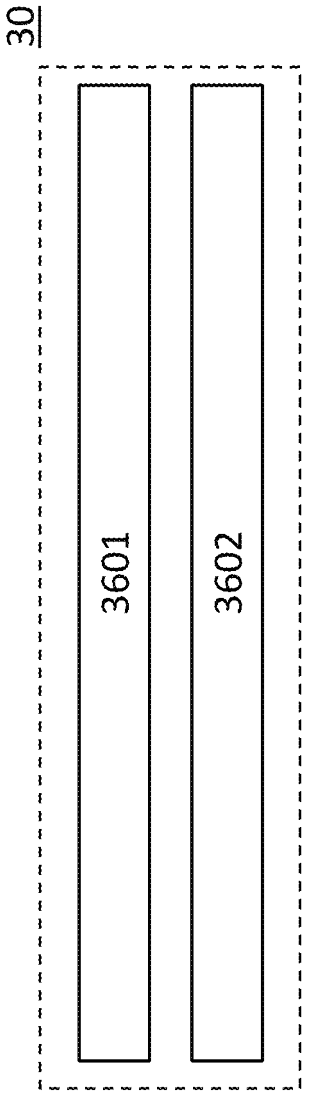
FIG. 14 illustrates a receiver according to an embodiment of the present disclosure.

FIG. 14 illustrates a further embodiment of the present disclosure. FIG. 14 illustrates a receiving device, i.e. a receiver 30, comprising: an input unit 3601 for receiving, from a transmission entity, a modulated shaped signal; and a processor 3602, wherein the processor 3602 is configured to: select a set of discrete prolate spheroidal, DPS, sequences, the DPS sequences forming a demodulation matrix; determine a shaping matrix P for shaping the selected set of DPS sequences and determine the transpose-conjugate matrix $P^H$ of the shaping matrix P; demodulate the modulated shaped signal by applying the demodulation matrix to the modulated shaped signal; equalize the demodulated shaped signal using a minimum mean square error, MMSE, equalization scheme; and apply the transpose-conjugate matrix $P^H$ of the shaping matrix P to the equalized demodulated shaped signal.

A shaped, i.e. precoded, Slepian-based waveform has been disclosed, which uses Discrete Prolate Spheroidal, DPS, sequences and enables Instantaneous-to-Average Power Ratio reduction while eliminating the need for inserting a guard interval in the time domain. This includes a full framework considering LDPC channel coding. The disclosed Slepian-based waveform is well localized in time-frequency domain. The present disclosure keeps the transceiver implementation within affordable complexity and satisfies the 5G design criteria. The disclosed Slepian-based waveform's performance outperforms the DFT-s-f-OFDM performance.

What is claimed is:

1. A communication method performed by a transmitter, the method comprising:

obtaining a plurality of data symbols;

selecting a set of discrete prolate spheroidal; (DPS); sequences to form a Slepian modulation matrix;

determining a shaping matrix for precoding the selected set of DPS sequences;

applying the shaping matrix to the plurality of data symbols to obtain shaped data symbols;

modulating the shaped data symbols by applying the Slepian modulation matrix to the shaped data symbols to obtain a modulated sequence of shaped data symbols; and transmitting the modulated sequence of shaped data symbols to a receiver.

2. The communication method according to claim 1, wherein the shaping matrix for precoding the selected set of DPS sequences is a matrix P of size $N_p \times N_p$ and is given by:

$$P = \underset{X}{\operatorname{argmin}} \|A - SX\|_F^2$$

$$\text{subject to } X^H X = I;$$

wherein $$A = F_1^H F_2,$$

where $$F_1^H$$

is a $J \times N_p$ inverse discrete Fourier transform (DFT) matrix, $F_2$ is a $N_p \times N_p$ DFT matrix, and A is a $J \times N_p$ DFT spread orthogonal frequency division multiplexing (DFT-s-OFDM) modulation matrix, and wherein S is the Slepian modulation matrix of size $J \times N_p$ obtained by stacking the first $N_p$ DPS sequences, where J and $N_p$ are positive integers.

3. The communication method according to claim 1, wherein selecting the set of DPS sequences to form the Slepian modulation matrix comprises:

for a frequency band $B_s$ with a central frequency $f_c$, choosing $N_p$ orthonormal DPS sequences of length $T=JT_s$, where $T_s$ is the sampling time, the DPS sequences having confined energy in the frequency band $B_s$, the DPS sequences corresponding to the first $N_p$ eigenvectors of a Slepian matrix C, wherein the elements of the Slepian matrix C are given by:

$$C[p, q] = \frac{\sin(\pi B_s T_s (p - q))}{\pi(p - q)}, \ (p, q) \in \{1, \ldots, J\}^2$$

wherein the eigenvalue decomposition is given by $C=UDU^H$, where the eigenvectors of C are $\{u_j\}_{j=1, \ldots, J}$, where U is a matrix, and the DPS sequences are stacked to form the columns of U, wherein $\lambda_{j_{j=1, \ldots, J}}$ are the eigenvalues of C, and the columns of U are ordered according to $\lambda_1 \geq \lambda_2 \ldots \geq \lambda_J$, and wherein the Slepian modulation matrix S is a matrix of size $J \times N_p$ obtained by stacking the first $N_p$ DPS sequences, where $U^H$ is the transpose-conjugate of U, and J and $N_p$ are positive integers.

4. The communication method according to claim 1, wherein the plurality of data symbols are coded using low-density parity-check (LDPC) channel coding, and the encoded bits are mapped to $N_p$ complex symbols following a quadrature amplitude modulation of order M (QAM-M), and the $N_p$ complex symbols are stacked into a vector $d_k$.

5. A communication method performed at a receiver, the method comprising:

receiving a modulated shaped signal;

selecting a set of discrete prolate spheroidal (DPS) sequences, the DPS sequences forming a demodulation matrix;

determining a shaping matrix P for shaping the selected set of DPS sequences and determining a transpose-conjugate matrix $P^H$ of the shaping matrix P;

demodulating the modulated shaped signal by applying the demodulation matrix to the modulated shaped signal;

equalizing the demodulated shaped signal using a minimum mean square error (MMSE) equalization scheme; and applying the transpose-conjugate matrix $P^H$ of the shaping matrix P to the equalized demodulated shaped signal.

6. The communication method according to claim 5, wherein the shaping matrix P is a matrix of size $N_p \times N_p$ and is given by:

$$P = \underset{X}{\operatorname{argmin}} \|A - SX\|_F^2$$

$$\text{subject to } X^H X = I;$$

wherein $$A = F_1^H F_2,$$

where $$F_1^H$$

is a $J \times N_p$ inverse discrete Fourier transform (DFT) matrix, $F_2$ is a $N_p \times N_p$ DFT matrix, and A is a $J \times N_p$ DFT spread orthogonal frequency division multiplexing (DFT-s-OFDM) modulation matrix, and wherein S is a Slepian modulation matrix of size $J \times N_p$ obtained by stacking the first $N_p$ DPS sequences, where J and $N_p$ are positive integers.

7. The communication method according to claim 5, wherein selecting the set of DPS sequences forming the demodulation matrix comprises:

for a frequency band $B_s$ with a central frequency $f_c$, choosing $N_p$ or all orthonormal DPS sequences of length $T=JT_s$, where $T_s$ is the sampling time, the DPS sequences having confined energy in the frequency band $B_s$, the DPS sequences corresponding to the first $N_p$ or all eigenvectors of a Slepian matrix C, wherein the elements of the Slepian matrix C are given by:

$$C[p, q] = \frac{\sin(\pi B_s T_s (p-q))}{\pi(p-q)}, \; (p, q) \in \{1, \ldots, J\}^2$$

wherein the eigenvalue decomposition is given by $C=UDU^H$, where the eigenvectors of C are $\{u_j\}_{j=1, \ldots, J}$, where U is a matrix, and the DPS sequences are stacked to form the columns of U, wherein $\lambda_{j_{j=1, \ldots, J}}$ are the eigenvalues of C and the columns of U are ordered according to $\lambda_1 \geq \lambda_2 \ldots \geq \lambda_J$, and wherein $U^H$ is the demodulation matrix, where $U^H$ is a matrix of size $J \times J$, where $U^H$ is the transpose-conjugate of U, and J and $N_p$ are positive integers.

8. The communication method according to claim 5, wherein the plurality of data symbols are decoded using low-density parity-check (LDPC) channel coding, the encoded bits are mapped to $N_p$ complex symbols following a quadrature amplitude modulation of order M (QAM-M), and the $N_p$ complex symbols are stacked into a vector $d_k$.

9. A transmitter, comprising:

an input configured to obtain a plurality of data symbols; and a processor configured to:

select a set of discrete prolate spheroidal (DPS) sequences to form a Slepian modulation matrix;

determine a shaping matrix for precoding the selected set of DPS sequences;

apply the shaping matrix to the plurality of data symbols to obtain shaped data symbols;

modulate the shaped data symbols by applying the Slepian modulation matrix to the shaped data symbols to obtain a modulated sequence of shaped data symbols; and transmit the modulated sequence of shaped data symbols to a receiver.

10. The transmitter according to claim 9, wherein the shaping matrix for precoding the selected set of DPS sequences is a matrix P of size $N_p \times N_p$ and is given by:

$$P = \underset{X}{\mathrm{argmin}} \|A - SX\|_F^2$$

$$\text{subject to } X^H X = I;$$

wherein $$A = F_1^H F_2,$$

where $$F_1^H$$

is a $J \times N$ inverse discrete Fourier transform (DFT) matrix, $F_2$ is a $N_p \times N_p$ DFT matrix, and A is a $J \times N_p$ DFT spread orthogonal frequency division multiplexing (DFT-s-OFDM) modulation matrix, and wherein S is the Slepian modulation matrix of size $J \times N_p$ obtained by stacking the first $N_p$ DPS sequences, where J and $N_p$ are positive integers.

11. The transmitter according to claim 9, wherein, to select the set of DPS sequences forming the Slepian modulation matrix, the transmitter is configured to:

choose, for a frequency band $B_s$ with a central frequency $f_c$, $N_p$ orthonormal DPS sequences of length $T=JT_s$, where $T_s$ is the sampling time, the DPS sequences having confined energy in the frequency band $B_s$, the DPS sequences corresponding to the first $N_p$ eigenvectors of a Slepian matrix C, wherein the elements of the Slepian matrix C are given by:

$$C[p, q] = \frac{\sin(\pi B_s T_s (p-q))}{\pi(p-q)}, \; (p, q) \in \{1, \ldots, J\}^2$$

wherein the eigenvalue decomposition is given by $C=UDU^H$, where the eigenvectors of C are $\{u_j\}_{j=1, \ldots, J}$, where U is a matrix, and the DPS sequences are stacked to form the columns of U, wherein $\lambda_{j_{j=1, \ldots, J}}$ are the eigenvalues of C and the columns of U are ordered according to $\lambda_1 \geq \lambda_2 \ldots \geq \lambda_J$, and wherein the Slepian modulation matrix S is a matrix of size $J \times N_p$ obtained by stacking the first $N_p$ DPS sequences, where $U^H$ is the transpose-conjugate of U, and J and $N_p$ are positive integers.

12. The transmitter according to claim 9, wherein the processor is further configured to:

encode the plurality of data symbols using low-density parity-check (LDPC) channel coding, map the encoded bits to $N_p$ complex symbols following a quadrature amplitude modulation of order M (QAM-M), and stack the $N_p$ complex symbols into a vector $d_k$.

13. The transmitter according to claim 9, wherein the transmitter is a single-band transceiver or a multi-band transmitter.

14. A receiver, comprising:

an input configured to receive a modulated shaped signal; and a processor configured to:

select a set of discrete prolate spheroidal (DPS) sequences, the DPS sequences forming a demodulation matrix;

determine a shaping matrix P for shaping the selected set of DPS sequences and determine a transpose-conjugate matrix $P^H$ of the shaping matrix P;

demodulate the modulated shaped signal by applying the demodulation matrix to the modulated shaped signal;

equalize the demodulated shaped signal using a minimum mean square error (MMSE) equalization scheme; and apply the transpose-conjugate matrix $P^H$ of the shaping matrix P to the equalized demodulated shaped signal.

15. The receiver according to claim 14, wherein the shaping matrix P is a matrix of size $N_p \times N_p$ and is given by:

$$P = \underset{X}{\operatorname{argmin}} \|A - SX\|_F^2$$

$$\text{subject to } X^H X = I;$$

wherein $$A = F_1^H F_2,$$

where $$F_1^H$$

is a $J \times N_p$ inverse discrete Fourier transform (DFT) matrix, $F_2$ is a $N_p \times N_p$ DFT matrix, and A is a $J \times N_p$ DFT spread orthogonal frequency division multiplexing (DFT-s-OFDM) modulation matrix, and wherein S is a Slepian modulation matrix of size $J \times N_p$ obtained by stacking the first $N_p$ DPS sequences, where J and $N_p$ are positive integers.

16. The receiver according to claim 14, wherein, to select the set of DPS sequences forming the demodulation matrix, the receiver is configured to:

choose, for a frequency band $B_s$ with a central frequency $f_c$, $N_p$ or all orthonormal DPS sequences of length $T=JT_s$, where $T_s$ is the sampling time, the DPS sequences having confined energy in the frequency band $B_s$, the DPS sequences corresponding to the first $N_p$ or all eigenvectors of a Slepian matrix C, wherein the elements of the Slepian matrix C are given by:

$$C[p, q] = \frac{\sin(\pi B_s T_s (p - q))}{\pi (p - q)}, (p, q) \in \{1, \ldots, J\}^2$$

wherein the eigenvalue decomposition is given by $C=UDU^H$, where the eigenvectors of C are $\{u_j\}_{j=1, \ldots, J}$, where U is a matrix and the DPS sequences are stacked to form the columns of U, wherein $\lambda_{j_{j=1, \ldots, J}}$ are the eigenvalues of C and the columns of U are ordered according to $\lambda_1 \geq \lambda_2 \ldots \geq \lambda_J$, and wherein $U^H$ is the demodulation matrix, where $U^H$ is a matrix of size $J \times J$, where $U^H$ is the transpose-conjugate of U, and J and $N_p$ are positive integers.

17. The receiver according to claim 14, wherein the processor is further configured to:

decode the plurality of data symbols using low-density parity-check (LDPC) channel coding, map the encoded bits to $N_p$ complex symbols following a quadrature amplitude modulation of order M (QAM-M), and stack the $N_p$ complex symbols into a vector $d_k$.

18. The receiver according to claim 14, wherein the receiver is a single-band transceiver or a multi-band receiver.

* * * * *